United States Patent [19]
Karklins et al.

[11] 4,222,805
[45] Sep. 16, 1980

[54] PLASTIC DUST TUBE FOR SHOCK ABSORBER AND METHOD OF MANUFACTURE

[75] Inventors: Elgin J. Karklins; Charles W. Spindler, both of Kettering, Ohio

[73] Assignee: General Motors Corporation, Detroit, Mich.

[21] Appl. No.: 23,583

[22] Filed: Mar. 26, 1979

Related U.S. Application Data

[62] Division of Ser. No. 856,842, Dec. 2, 1977, Pat. No. 4,167,991.

[51] Int. Cl.² .............................................. B65H 8/00
[52] U.S. Cl. .................................. 156/184; 156/215; 156/218
[58] Field of Search ............... 156/212, 214, 215, 217, 156/218, 203, 184; 220/67; 138/89.1, 89.4, 166; 229/5.5; 113/116 CC, 116 QA, 116 UT, 120 F, 120 K, 120 Y, 120 XY, 121 A; 29/437–440; 188/322

[56] References Cited

U.S. PATENT DOCUMENTS

| | | | |
|---|---|---|---|
| 2,308,600 | 1/1943 | Gaynor | 220/67 X |
| 2,456,488 | 12/1948 | Brown | 220/306 X |
| 3,152,480 | 10/1964 | Hoff | 73/431 |
| 3,313,333 | 4/1967 | Lordi | 229/5.5 X |
| 3,830,347 | 8/1974 | Fader et al. | 188/322 |
| 3,907,080 | 9/1975 | Chadwick | 188/322 |
| 3,948,704 | 4/1976 | Evans | 156/215 X |
| 4,036,358 | 7/1977 | Kelly | 220/307 X |

FOREIGN PATENT DOCUMENTS 1083382  9/1967  United Kingdom .

*Primary Examiner*—David A. Simmons
*Attorney, Agent, or Firm*—Charles R. White

[57] ABSTRACT

This cylindrical shock absorber has a piston rod extending outwardly therefrom to which a disc-like upper cover plate is secured. The cover plate is castellated with peripheral teeth arcuately spaced from one another extending radially from the outer edges. The dust tube is formed from plastic sheet stock having a series of perforations adjacent one edge sized and spaced to receive the teeth of the cover plate. The sheets are wrapped onto the cover plate with the teeth projecting through the openings to form an outer cylinder. The adjacent end edges of the cylinder are heat welded or otherwise secured so that the cylinder is retained on the cover plate to form a cylindrical dust tube.

2 Claims, 5 Drawing Figures

PLASTIC DUST TUBE FOR SHOCK ABSORBER AND METHOD OF MANUFACTURE

This is a division of application Ser. No. 856,842, filed Dec. 2, 1977, now U.S. Pat. No. 4,167,991.

This invention relates to shock absorbers and more particularly to a new and improved plastic dust tube and cover plate assembly for a shock absorber and to a new and improved method of attaching a plastic dust tube to the shock absorber cover plate.

Prior to the present invention, plastic dust tubes, proposed or employed as replacement for protective metallic dust tubes on shock absorbers to reduce shock absorber weight and to eliminate painting and potential metal-to-metal contact, have had limited acceptance because they generally are costly moldings and are pre-sized and limited to certain mountings. The presently used shock absorbers employ a large variety of dust tube mountings so that a wide variety of sized molded dust tubes would be required. In order to overcome these disadvantages, this invention utilizes plastic stock wrapped into a cylinder and seam welded to form a new and improved dust tube for a wide range of different sized shock absorbers.

In the preferred embodiment of this invention, the dust tube can be made from a suitable thermoplastic such as polypropylene stock in roll or individual sheet form. Such stock can be produced economically by well known extrusion or rolling methods. In this invention, the dust tube is initially formed from a pre-punched reel of stock material or from a stack of pre-cut and pre-punched separate blanks. An alternative to this is to use a constant width reeled stock that provides the desired circumference which is subsequently cut and punched in the same operation after being fed from the reel. This reduces waste since one size shock absorber uses the same size blank for the dust tube. Length variation for different strokes can be made by cutting and punching at the desired lengths along the leading edge of the roll of stock material. In the preferred embodiment of this invention, there is a sprocket-type cover plate which is used as one end of the assembly and the plastic stock or blank is wrapped thereon. Once the stock is wrapped into a cylinder, preferably with end edges overlapping, the dust tube is joined at the seam by direct heat welding or by ultrasonic welding means. This joining could also be a snap together design if desired.

With this invention, a new and improved wrapped and seamed dust tube is provided which allows the shock absorber components to be fully assembled prior to dust tube application. Furthermore, the shock absorber may be completed, painted or otherwise treated with rust preventatives prior to application of the dust tube. Additionally, since there are no rusting possibilities with the plastic material, the dust tube has a long service life and does not require painting. The dust tube of this invention can be used with various types of shock absorbing mountings and employs economical material for dust tube shock absorbers. With this invention, minimum inventory has to be maintained since the same stock covers all shock absorbers of the same size but with different strokes.

These and other features, objects and advantages of this invention will be more apparent from the following detailed description and drawings in which.

Figure 1:
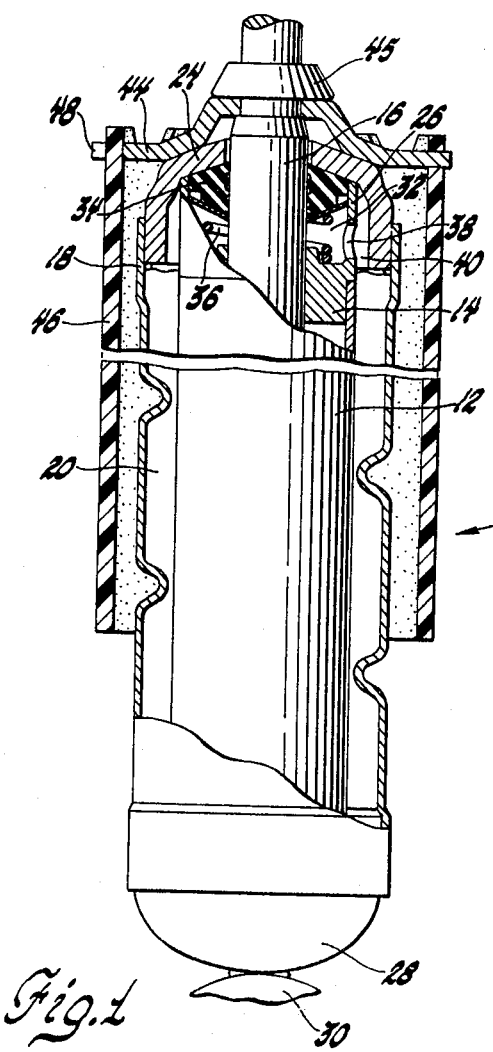
FIG. 1 is a vertical cross sectional view of a shock absorber incorporating the cover plate and dust tube assembly of this invention.

As shown in FIG. 1, there is a shock absorber 10 having an interior pressure cylinder 12 closed at its upper end by a rod guide 14. The cylinder receives a reciprocally movable piston, not shown, which is carried on the end of the piston rod 16 that extends through the rod guide 14 and outwardly from the upper end of the shock absorber.

A reservoir tube 18 surrounds the pressure cylinder 12 and the annular space between reservoir tube and pressure cylinder formed a reservoir 20 for hydraulic fluid employed as the damping medium of the shock absorber. The upper end of reservoir tube 18 has a cup-like end cap 24 secured thereto which seats against the upper cylindrical end 26 of the rod guide 14. The opposite end of the reservoir tube 18 is closed by a cap 28 having a mounting ring 30 secured thereto for vehicle attachment. The upper end of rod guide 14 forms a chamber 32 receiving a resilient elastomer rod seal member 34 held under compression by spring 36 disposed between the rod guide and the lower end of the rod seal. The seal chamber 32 is connected with the reservoir 20 through an opening 38 in the rod guide 14 and one or more passages 40 between the end cap 24 and the outer periphery of rod guide 14. The piston rod 16 extends through the rod seal 34 and end cap 24 and carries a disc-like cover plate 44 secured thereto by welded collar 45. The cover plate in turn has a plastic dust tube 46 attached thereto which extends downwardly and around the reservoir tube as shown in FIG. 1. The cover plate and dust tube assembly protects the components interior thereof from stones or other road hazards, dust and dirt.

Figure 2:
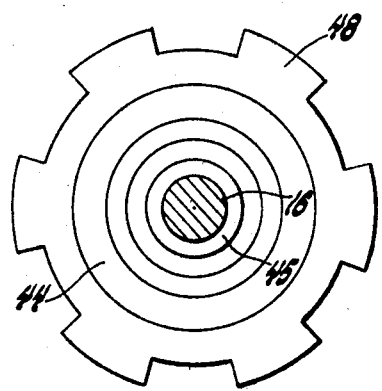
FIG. 2 is a top plane view of the sprocket-like cover plate of FIG. 1.
Figure 3:
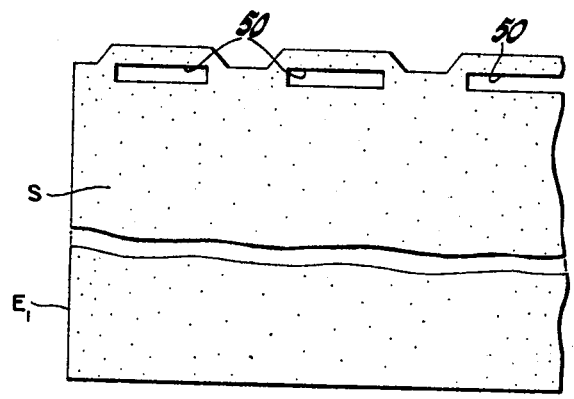
FIG. 3 is a side view of stock material used in this invention.
Figure 4:
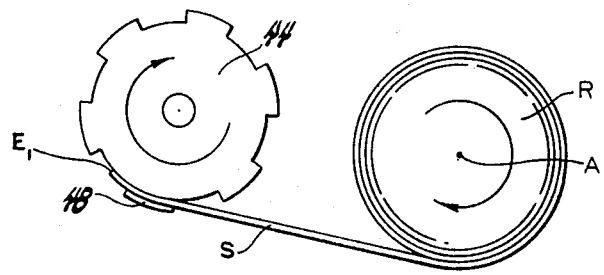
FIG. 4 is a diagrammatic view showing the reeled stock of FIG. 3 being applied to the sprocket-like cover plate of FIG. 1.
Figure 5:
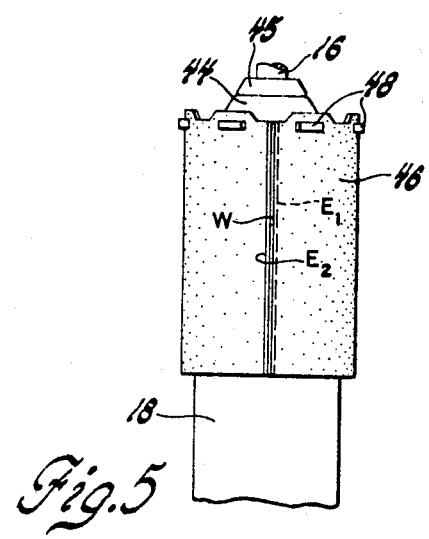
FIG. 5 is a side view of the portion of a shock absorber with the plastic dust tube welded in place and secured to the cover plate.

As best shown by FIGS. 1 and 2, the cover plate 44 has teeth 46 forming castellations extending radially from the periphery thereof for attaching the plastic dust tube to the shock absorber. FIG. 3 illustrates the flexible plastic sheet stock S, preferably polypropylene, which is used in forming the dust tube. The stock S has a plurality of spaced perforations or openings 50 pre-punched in the upper edge thereof which are sized to receive the teeth 46 and which are spaced to correspond with the spacing between the teeth of the cover plate. The stock S is preferably an elongated sheet stored on a reel R suitably supported for rotation about axis A. The stock is initially connected to the cover plate by inserting a first tooth 46 through the first opening 50 in the stock; subsequently the cover plate is rotated by a suitable drive mechanism for one revolution as indicated in FIG. 4. As the turn is made, the teeth 46 of the cover plate will be progressively fed into the successive openings 50 of the stock as that the stock is pulled from reel R. After the turn is completed, the stock is severed widthwise from the reel so that the trailing edge $E_2$ is parallel to the leading edge $E_1$. With edges $E_1$ and $E_2$ abutting or overlapping one another as shown in FIG.

5, a seam is formed that is seam welded at W by ultrasonic or other suitable heat means. After welding of the dust tube, the shock absorber assembly is complete.

Instead of employing a reel of plastic tape or stock for making the dust tube, it will be appreciated that the stock can be pre-cut into specific lengths so that it can be conveniently stacked and subsequently wound onto the cover plate with the edges overlapping or meeting on an interface so that they may be joinded by suitable welding operations such as that described above.

This invention is not limited to the details of the construction and method shown and described for purposes of illustrating the invention for other modifications and methods falling within the scope of the appended claims will occur to those skilled in the art.

We claim:

1. A method of making a dust tube for a shock absorber comprising the steps of forming an annular cover plate with a series of arcuately spaced teeth projecting radially from the periphery thereof, providing a sheet of flexible plastic material of predetermined length and width, forming a plurality of openings along one edge of said sheet spaced by an amount equal to the arcuate spacing between said teeth and with each opening sized to accommodate a corresponding one of said teeth, inserting one of said teeth into one of said openings, winding said sheet onto said cover plate and serially inserting the other of said teeth through the other of said openings of said sheet to thereby form said sheet into a cylinder, and securing adjacent side edge portions of said cylinder to each other to thereby secure said dust tube to said cover plate to complete said dust tube.

2. A method of making a cylindrical plastic dust tube for a shock absorber comprising the steps of forming an annular cover plate of thin metal with a series of arcuately spaced and radially extending teeth projecting from the periphery thereof, providing a sheet of thin walled flexible plastic material, forming a plurality of openings along an upper edge of said sheet spaced by an amount equal to the spacing between said teeth, inserting one of said teeth into a first one of said openings, rotating said cover plate relative to said sheet so that said teeth are serially inserted through the other of said openings of said sheet, terminating said rotation when said sheet is turned into a cylinder, positioning the side edges of said sheet adjacent to each other and subsequently welding said side edges to each other to secure said cylinder to said cover plate and thereby complete said dust tube.

* * * * *